(12) United States Patent
Oh

(10) Patent No.: US 7,420,766 B2
(45) Date of Patent: Sep. 2, 2008

(54) VIDEO CASSETTE RECORDER

(75) Inventor: Gue-sik Oh, Hwaseong-si (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 260 days.

(21) Appl. No.: 11/219,883

(22) Filed: Sep. 7, 2005

(65) Prior Publication Data

US 2006/0146438 A1  Jul. 6, 2006

(30) Foreign Application Priority Data

Dec. 31, 2004  (KR) .................... 10-2004-0118084

(51) Int. Cl.
*G11B 5/027* (2006.01)
(52) U.S. Cl. .......................................... 360/85
(58) Field of Classification Search .................. 360/85
See application file for complete search history.

(56) References Cited

U.S. PATENT DOCUMENTS 5,472,151 A * 12/1995 Choi et al. ............... 242/356.4
5,880,909 A * 3/1999 Jeong et al. .............. 360/291.3

FOREIGN PATENT DOCUMENTS

JP  2001-101732  4/2001
KR  1990-0010715  6/1990

* cited by examiner

*Primary Examiner*—Allen T Cao
(74) *Attorney, Agent, or Firm*—Roylance, Abrams, Berdo & Goodman, LLP

(57) ABSTRACT

A video cassette recorder has a recorder body with an outer case, a bottom plate, and operating parts mounted in the recorder body. The recorder includes a depression partially formed on the bottom plate which corresponds to the operating parts to lower the positions of the operating parts for minimizing the size of the video cassette recorder.

2 Claims, 3 Drawing Sheets

VIDEO CASSETTE RECORDER

CROSS-REFERENCE TO RELATED APPLICATIONS

This application claims the benefit of Korean Patent Application No. 2004-118084, filed on Dec. 31, 2004, the entire disclosure of which is hereby incorporated by reference.

BACKGROUND OF THE INVENTION

1. Field of the Invention

The present invention relates to a video cassette recorder. More particularly, the present invention relates to a video cassette recorder having a depression partially arranged on a bottom plate to minimize the size of the device.

2. Description of the Related Art

A video cassette recorder is an apparatus that records video and audio signals on a magnetic tape wound on tape reels of a cassette or reproduces the video and audio signals recorded on the magnetic tape.

As shown in FIG. 1, a conventional video cassette recorder comprises a recorder body 1, in which a circuit board 2 is disposed above a bottom plate 1a. Arranged above the circuit board 2 is a main deck 3, above which is disposed a cassette holder 5 to move a cassette 4 to the main deck 3. The circuit board 2, the main deck 3 and the cassette holder 5 are arranged in the recorder body 1 while being spaced apart from one another.

A pair of reel disks 6a and 6b are mounted on the main deck 2 to drive tape reels 4a and 4b of the cassette 4, respectively. A capstan motor 7 rotates the reel disks 6a and 6b, a clutch assembly 8 transmits power from the capstan motor 7 to the reel disks 6a and 6b, and an idler assembly 9 selectively transmits power from the clutch assembly 8 to the reel disks 6a and 6b.

The clutch assembly 8 and the capstan motor 7 are mounted under the main deck 3. A main rotary body 8a of the clutch assembly 8 is connected to a pulley 7a of the capstan motor 7 via a belt 8b. An opening 2a is formed in the circuit board 2 through which the main rotary body 8a of the clutch assembly 8 and the pulley 7a of the capstan motor 7 are disposed adjacent to the bottom plate 1a. When the main rotary body 8a of the clutch assembly 8 and the pulley 7a of the capstan motor 7 are disposed adjacent to the bottom plate 1a, as described above, the height of the recorder body 1 is reduced. Therefore, the size of the video cassette recorder is minimized.

In the conventional video cassette recorder; however, the main rotary body 8a of the clutch assembly 8 is spaced a predetermined distance, for example, approximately 3 mm, from the bottom plate 1a to ensure that the main rotary body 8a of the clutch assembly 8 rotates smoothly. This arrangement limits the ability to minimize the size of the video cassette recorder. Specifically, the bottom plate 1a is flat, and a predetermined gap is provided between the bottom plate 1a and the main rotary body 8a of the clutch assembly 8. Consequently, it is difficult to reduce the height of the video cassette recorder.

Accordingly, there is a need for an improved video cassette recorder having a depression of a predetermined depth partially formed on the bottom plate which corresponds to the operating parts disposed under the main deck to lower the positions of the operating parts for minimizing the size of the device.

SUMMARY OF THE INVENTION

An aspect of the present invention is to solve at least the above problems and/or disadvantages and to provide at least the advantages described below. Accordingly, an aspect of the present invention is to provide a video cassette recorder wherein the positions of the operating parts mounted adjacent to a bottom plate are lowered while the distance between the operating parts and the bottom plate is maintained, thereby, minimizing the size of the video cassette recorder.

In accordance with one aspect, the present invention provides a video cassette recorder comprising a recorder body having an outer case, a bottom plate, and operating parts mounted on the recorder body. A depression is partially formed on the bottom plate which corresponds to the operating parts to lower the positions of the operating parts for minimizing the size of the video cassette recorder.

Preferably, the video cassette recorder further comprises a main deck disposed in the recorder body. T main deck has a pair of reel disks and the operating parts include a capstan motor mounted under the main deck to rotate the reel disks and a clutch assembly to transmit power from the capstan motor to the reel disks.

Preferably, the video cassette recorder further comprises a circuit board disposed between the main deck and the bottom plate. The circuit board has an opening through which the operating parts are inserted.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
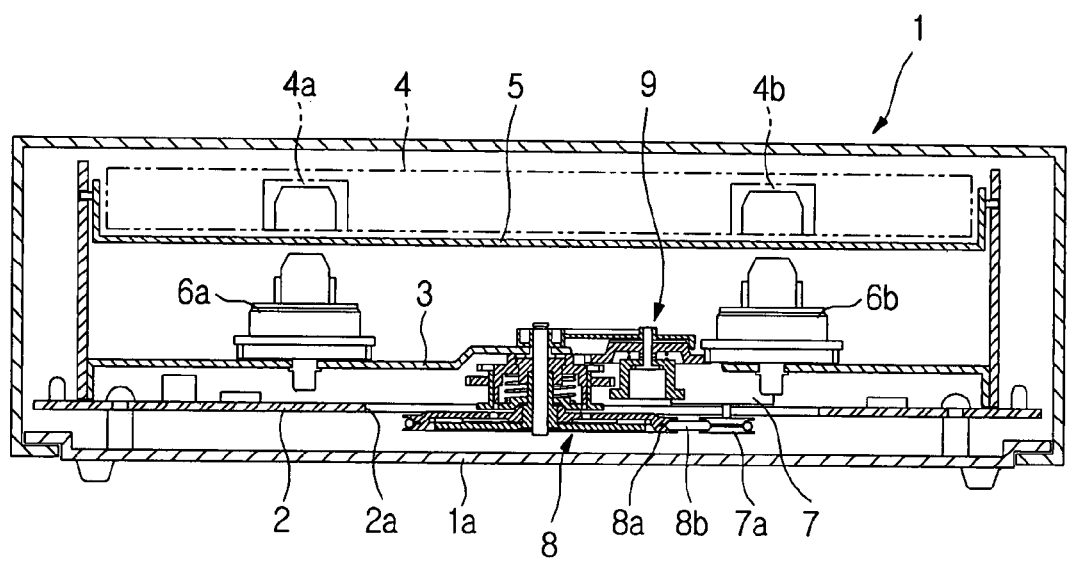
FIG. 1 is a sectional view showing the structure of a conventional video cassette recorder.
Figure 2:
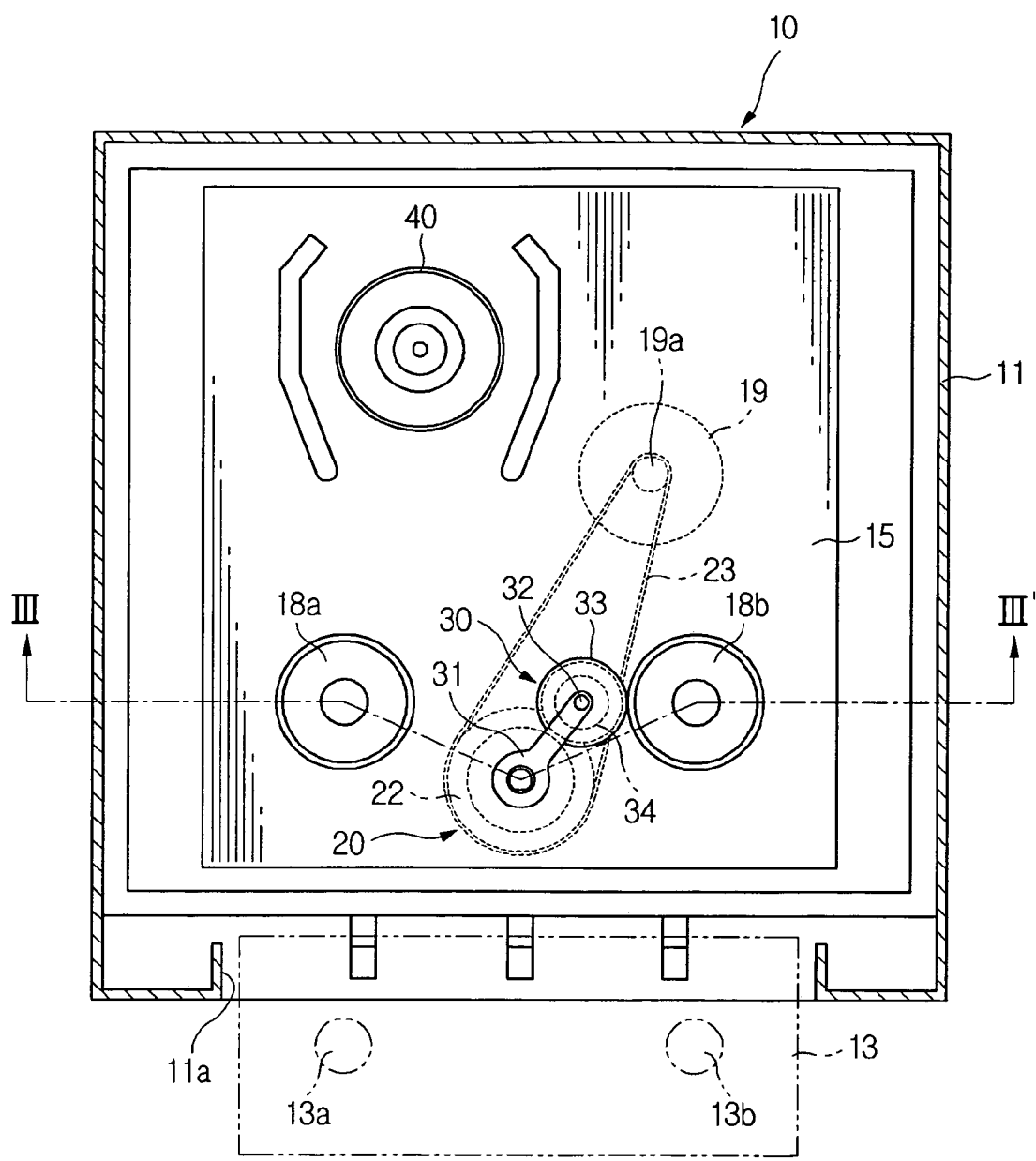
FIG. 2 is a transverse-sectional view showing the structure of a video cassette recorder according to an exemplary embodiment of the present invention.
Figure 3:
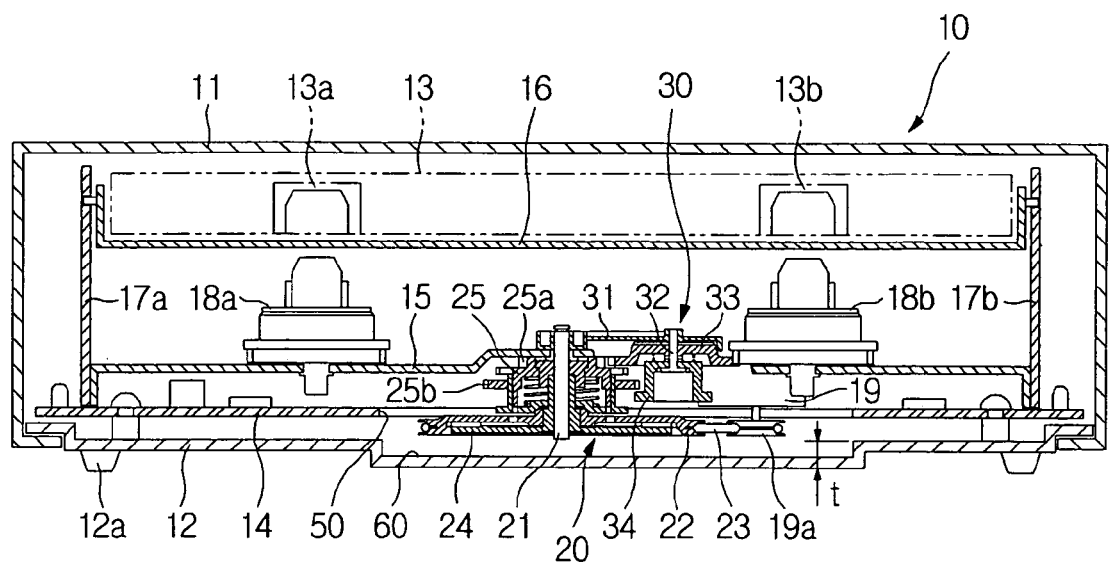
FIG. 3 is a sectional view taken along line III-III' of FIG. 2.

FIGS. 2 and 3 show a video cassette recorder according to an exemplary embodiment of the present invention. As shown in FIGS. 2 and 3, the video cassette recorder comprises a recorder body 10. The recorder body 10 includes an outer case 11 having an inlet part 11a formed on the front surface thereof, through which a cassette 13 is introduced into the outer case 11. A bottom plate 12 is attached to the bottom of the outer case 11. The bottom plate 12 has a plurality of support legs 12a disposed on the lower surface thereof.

A circuit board 14 is disposed in the recorder body 10. As shown in FIG. 3, the circuit board 14 is arranged adjacent to the bottom plate 12. Above the circuit board 14 is disposed a main deck 15, above which is disposed a cassette holder 16 to move a cassette 13 to the main deck 15. The main deck 15 and the cassette holder 16 are supported by support frames 17a and 17b disposed on both sides of the interior of the recorder body 10. Both ends of the cassette holder 16 are slidably mounted to the support frames 17a and 17b, respectively. The cassette holder 16 moves the cassette 13 introduced into the recorder body 10 through the inlet part 11a to the main deck 15 in the recorder body 10 or moves the cassette 13 back to the inlet part 11a.

The main deck 15 comprises a pair of reel disks 13a and 13b rotatably disposed on both sides of the upper surface thereof so that the reel disks 13a and 13b couple with the tape reels 13a and 13b of the cassette 13 to drive the tape reels 13a and 13b. A capstan motor 19 is disposed on the rear part of the main deck 15 to rotate the reel disks 18a and 18b. A clutch assembly 20 transmits power from the capstan motor 19 to the reel disks 18a and 18b. An idler assembly 30 selectively transmits power from the clutch assembly 20 to the reel disks 18a and 18b.

As shown in FIG. 2, at the upper surface of the rear part of the main deck 15 are disposed a head drum 40 and a loading unit (not shown). The head drum 40 records video or audio information on a magnetic tape of the cassette 13 or reproduce the video or audio information recorded on the magnetic tape. The loading unit (not shown) draws the magnetic tape out of the cassette 13 and makes the magnetic tape contact the head drum 40.

As shown in FIG. 3, the clutch assembly 20 and the capstan motor 19 are mounted under the main deck 15. The clutch assembly 20 comprises a main rotary body 22 rotatably supported by a shaft 21 under the main deck 15. The main rotary body 22 is connected to a pulley 19a of the capstan motor 19 via a belt 23. A frictional rotary body 24 is frictionally connects to the main rotary body 22. A clutch gear 25 transmits power directly to the main rotary body 22 when the clutch gear 25 is lowered by a pressurizing member while rotating along with the frictional rotary body 24. The clutch gear 25 has a smaller gear part 25a and a larger gear part 25b.

The idler assembly 30 comprises a connection lever 31 which is connected to the upper end of the shaft 21 of the main rotary body 22 of the clutch assembly 20. A larger gear 33 and a smaller gear 34 are coaxially mounted to a support shaft 32 on the connection lever 31. The larger gear 33 and the smaller gear 34 of the idler assembly 30 are rotated at about the same angular velocity. The larger gear 33, which is disposed above the smaller gear 34, selectively engages with one of the reel disks 18a and 18b as the connection lever 31 rotates according to a change of the rotation direction of the main rotary body 22. The larger gear 33 also engages with the smaller gear part 25a of the clutch gear 25. The smaller gear 34, which is disposed under the larger gear 33, engages with the larger gear part 25b of the clutch gear 25 when the clutch gear 25 is lowered by the pressurizing member. When the clutch gear 25 is lowered, the larger gear 33 disengages from the smaller gear part 25a of the clutch gear 25.

An opening 50 is formed in the circuit board 14 through which the main rotary body 22 of the clutch assembly 20 and the pulley 19a of the capstan motor 19 are inserted downward, as shown in FIG. 3. As a result, the positions of operating parts mounted under the main deck 15 are lowered, and therefore, the total size of the video cassette recorder is minimized. Specifically, the main rotary body 22 of the clutch assembly 20 and the pulley 19a of the capstan motor 19 are disposed adjacent to the bottom plate 12, and therefore, the thickness of the video cassette recorder is minimized.

According to the exemplary embodiment of the present invention, a depression 60 of a predetermined depth (t) is formed on the bottom plate 12. The depression 60 lowers the positions of the main rotary body 22 of the clutch assembly 20 and the pulley 19a of the capstan motor 19. Meanwhile, the main rotary body 22 of the clutch assembly 20, and the pulley 19a of the capstan motor 19, are spaced a predetermined distance from the bottom plate 12 to ensure that the main rotary body 22 of the clutch assembly 20 and the pulley 19a of the capstan motor 19 operate properly.

The depression 60 is partially formed on the bottom plate 12 which corresponds to the main rotary body 22 and the capstan motor 19. As a result, the positions of the main rotary body 22 and the capstan motor 19 are further lowered. Therefore, the total size of the video cassette recorder is minimized. That is, the positions of the main rotary body 22 and the capstan motor 19 are lowered by the depth (t) of the depression 60, and therefore, the positions of the parts disposed in the recorder body 10 are further lowered. Consequently, the size of the video cassette recorder is minimized.

As apparent from the above description, the video cassette recorder according to the exemplary embodiment of the present invention has the depression of a predetermined depth partially formed on the bottom plate which corresponds to the operating parts disposed under the main deck to lower the positions of the operating parts while maintaining the distance between the operating parts and the bottom plate Therefore, the size of the video cassette recorder is minimized.

While the invention has been shown and described with reference to certain embodiments thereof, it will be understood by those skilled in the art that various changes in form and details may be made therein without departing from the spirit and scope of the invention as defined by the appended claims.

What is claimed is:

1. A video cassette recorder comprising:
    a recorder body comprising an outer case, a bottom plate, a main deck disposed on the recorder body, and operating parts mounted in the recorder body;
    a depression of a predetermined depth partially arranged on the bottom plate which corresponds to the operating parts to lower the positions of the operating parts for minimizing the size of the video cassette recorder; and
    a circuit board disposed between the main deck and the bottom plate, the circuit board comprising an opening through which the operating parts are inserted;
    wherein a plurality of support legs are provided on a part of the bottom plate not having the depression;
    wherein the support legs extend up to or beyond a lower face of the depression.

2. A method of assembling a video cassette recorder comprising the steps of:
    providing a recorder body comprising an outer case, a bottom plate, and operating parts mounted in the recorder body;
    arranging a depression at a predetermined depth on a portion of the bottom plate which corresponds to the operating parts to lower the positions of the operating parts for minimizing the size of the video cassette recorder;
    positioning a main deck on the recorder body; and
    positioning a circuit board between the main deck and the bottom plate, the circuit board comprising an opening through which the operating parts are inserted;
    wherein a plurality of support legs are provided on a part of the bottom plate not having the depression;
    wherein the support legs extend up to or beyond a lower face of the depression.

* * * * *